(12) United States Patent
Tenzer et al.

(10) Patent No.: US 9,705,129 B2
(45) Date of Patent: Jul. 11, 2017

(54) PROCESS FOR PRODUCING AN ELECTRODE FOR AN ELECTROCHEMICAL ENERGY STORAGE MEANS AND ELECTRODE

(71) Applicant: Robert Bosch GmbH, Stuttgart (DE)

(72) Inventors: Martin Tenzer, Nuertingen (DE); Jens Grimminger, Leonberg (DE); Bernd Schumann, Rutesheim (DE); Ulrich Eisele, Stuttgart (DE); Constanze Sorhage, Stuttgart (DE); Ingo Kerkamm, Stuttgart-Rohr (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 14/403,299

(22) PCT Filed: Apr. 24, 2013

(86) PCT No.: PCT/EP2013/058416
§ 371 (c)(1),
(2) Date: Nov. 24, 2014

(87) PCT Pub. No.: WO2013/174592
PCT Pub. Date: Nov. 28, 2013

(65) Prior Publication Data
US 2015/0155547 A1    Jun. 4, 2015

(30) Foreign Application Priority Data
May 23, 2012    (DE) .................. 10 2012 208 608

(51) Int. Cl.
*H01M 4/36*    (2006.01)
*H01M 4/04*    (2006.01)
(Continued)

(52) U.S. Cl.
CPC .......... *H01M 4/364* (2013.01); *C01G 23/005* (2013.01); *H01M 4/0471* (2013.01);
(Continued)

(58) Field of Classification Search
None
See application file for complete search history.

(56) References Cited

U.S. PATENT DOCUMENTS 6,475,673 B1    11/2002    Yamawaki et al.
6,645,673 B2    11/2003    Yamawaki et al.
(Continued)

FOREIGN PATENT DOCUMENTS

CN    1919736 A    2/2007
CN    102328953 A    1/2012
(Continued)

OTHER PUBLICATIONS

Keiichi Minami et al., "Electrical and electrochemical properties of glass-ceramic electrolytes in the systems Li2S—P2S5—P2S3 and Li2S—P2S5—P2O5", Solid State Ionics,192, 2011, pp. 122-125.
(Continued)

*Primary Examiner* — Scott J Chmielecki
(74) *Attorney, Agent, or Firm* — Norton Rose Fulbright US LLP; Gerard Messina

(57) ABSTRACT

The subject matter of the present is a method for manufacturing an electrode for an electrochemical energy reservoir, in particular for a lithium-ion battery, encompassing the method steps of: a) furnishing a mixture of initial substances for formation of a lithium titanate; b) calcining the mixture of initial substances for formation of a lithium titanate; c) adding to the mixture of initial substances for formation of a lithium titanate, before and/or after calcination, a component encompassing sulfur and optionally lithium; and/or d) adding a pore former, before and/or after calcination, to the
(Continued)

mixture of initial substances for formation of a lithium titanate; e) sintering the calcined product; and f) optionally removing the pore former from the calcined and optionally sintered product. Electrodes having a particularly defined pore structure can be generated with a method of this kind, thereby making possible particularly good capacity that is stable over the long term. A further subject is an electrode for use in a lithium-ion battery, as well as a lithium-ion battery.

20 Claims, 1 Drawing Sheet

(51) Int. Cl.
*H01M 4/1391* (2010.01)
*H01M 4/485* (2010.01)
*C01G 23/00* (2006.01)
*H01M 4/131* (2010.01)
*H01M 4/136* (2010.01)
*H01M 10/052* (2010.01)
*H01M 10/0562* (2010.01)
*H01M 4/02* (2006.01)

(52) U.S. Cl.
CPC .......... *H01M 4/131* (2013.01); *H01M 4/136* (2013.01); *H01M 4/1391* (2013.01); *H01M 4/485* (2013.01); *H01M 10/052* (2013.01); *H01M 10/0562* (2013.01); *H01M 2004/028* (2013.01); *H01M 2300/0068* (2013.01)

(56) References Cited

U.S. PATENT DOCUMENTS

| | | | |
|---|---|---|---|
| 2007/0072768 A1* | 3/2007 | Essaki | B01J 20/041 502/400 |
| 2007/0281211 A1* | 12/2007 | Zhang | C01G 23/005 429/231.1 |
| 2008/0285211 A1 | 11/2008 | Zaghib et al. | |
| 2008/0300127 A1 | 12/2008 | Tennent et al. | |
| 2009/0246562 A1* | 10/2009 | Hilmi | H01M 4/8652 429/406 |
| 2010/0285363 A1* | 11/2010 | Christensen | H01M 4/131 429/231.95 |
| 2011/0133117 A1* | 6/2011 | Awano | C01G 23/005 252/182.1 |
| 2012/0064401 A1* | 3/2012 | Liu | H01M 4/364 429/209 |
| 2012/0070744 A1* | 3/2012 | Moriyama | C01G 23/005 429/231.1 |
| 2012/0168696 A1* | 7/2012 | Huang | H01M 4/1397 252/521.5 |
| 2012/0295168 A1* | 11/2012 | Holzapfel | C01B 25/37 429/319 |
| 2012/0308574 A1* | 12/2012 | Lee | C07K 14/70542 424/142.1 |
| 2013/0149567 A1* | 6/2013 | Schaefer | H01M 2/1606 429/50 |
| 2013/0168252 A1* | 7/2013 | Ogihara | H01M 4/525 205/50 |
| 2013/0171502 A1* | 7/2013 | Chen | H01G 11/06 429/149 |
| 2014/0308574 A1* | 10/2014 | Ensling | H01M 2/1673 429/164 |
| 2014/0312269 A1* | 10/2014 | Laumann | C01G 23/00 252/182.1 |
| 2015/0044576 A1* | 2/2015 | Eisele | C01G 33/006 429/322 |
| 2015/0111104 A1* | 4/2015 | Engel | H01M 10/052 429/220 |

FOREIGN PATENT DOCUMENTS

| | | |
|---|---|---|
| EP | 2131421 | 12/2009 |
| EP | 2339674 | 6/2011 |
| WO | WO2010/129875 | 11/2010 |
| WO | WO2011/145462 | 11/2011 |

OTHER PUBLICATIONS

Hirokazu Kitaura et al., "Electrochemical performance of all-solid-state lithium secondary batteries using Li4Ti5O12 electrode and Li2S—P2S5 solid electrolytes", Materials Research Society, vol. 25, No. 8, 2010, pp. 1548-1553.

Hirokazu Kitaura et al., "Fabrication of electrode-electrolyte interfaces in all-solid-state rechargeable lithium batteries by using a supercooled liquid state of the glassy electrolytes", Journal of Materials Chemistry, vol. 21, 2011, pp. 118-124.

Avdeev et al., "X-ray diffraction and Mössbauer spectroscopy studies of LiFe0.5Ti1.5O4- A new primitive cubic ordered spinel", Solid State Sciences, vol. 9, No. 12, 2007, pp. 1135-1139.

Chen, et al. "Progress in Research on Li4Ti5O12 as Anode for Electrochemical Devices", J. of Inorganic Materials, vol. 20, No. 3 (2005), pp. 537-544.

Tang, et al. "Research progress in electroni material Li4Ti5O12", Battery Bimonthly, vol. 37, No. 1 (2007), pp. 73-75.

* cited by examiner

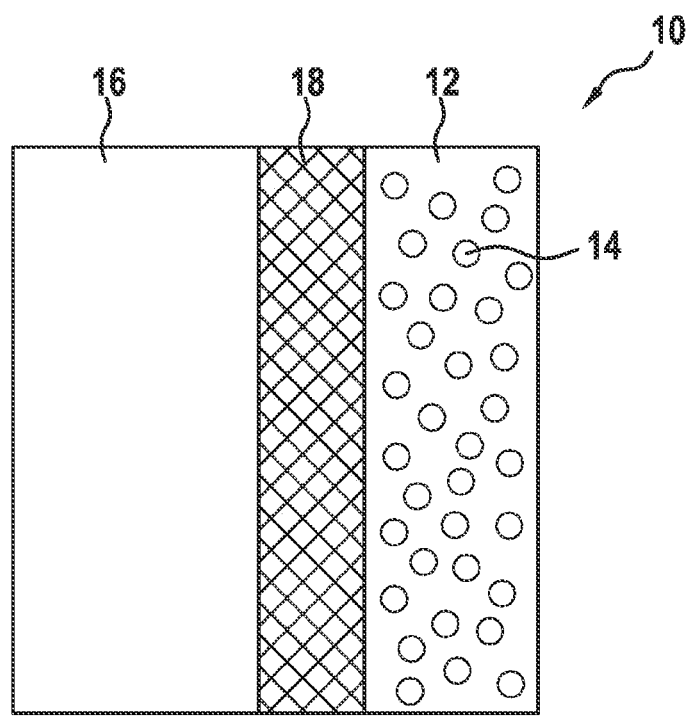

PROCESS FOR PRODUCING AN ELECTRODE FOR AN ELECTROCHEMICAL ENERGY STORAGE MEANS AND ELECTRODE

FIELD OF THE INVENTION

The present invention relates to a method for manufacturing an electrode for an electrochemical energy reservoir, and to an electrode for an electrochemical energy reservoir.

BACKGROUND INFORMATION

Electrochemical energy reservoirs, such as especially lithium-ion batteries, are used nowadays in many application sectors, for example in mobile communications or consumer electronics. Although energy reservoirs of this kind have a large storage capacity (up to 150 Wh/kg), there is still room for improvement.

Lithium-sulfur batteries, for example, can exhibit a high energy density of up to 600 Wh/kg. Such batteries are based in particular on the overall reaction $2\,Li+S=Li_2S$, with which a voltage of approximately 2.0 V to 2.5 V with respect to $Li/Li^+$ can be made available. At present, however, such lithium-sulfur batteries still exhibit some drawbacks. The microstructure of conventional cathodes made of a porous carbon/sulfur mixture, for example, can change during operation, which can result in an interruption of electrical contact to the sulfur and thus in a decrease in charge capacity and rate capability.

European Published Patent Application No. 2 339 674 discloses a lithium-sulfur battery. A lithium-sulfur battery of this kind has a cathode structure that encompasses a continuous layer of nanotubes or nanowires and also sulfur particles, the sulfur particles being attached to the nanotubes or nanowires, and the continuous layer being in contact with an electrolyte layer.

SUMMARY

The subject matter of the present invention is a method for manufacturing an electrode for an electrochemical energy reservoir, in particular for a lithium-ion battery, encompassing the method steps of:
a) furnishing a mixture of initial substances for formation of a lithium titanate;
b) calcining the mixture of initial substances for formation of a lithium titanate;
c) adding to the mixture of initial substances for formation of a lithium titanate, before and/or after calcination, a component encompassing sulfur and optionally lithium; and/or
d) adding a pore former, before and/or after calcination, to the mixture of initial substances for formation of a lithium titanate;
e) sintering the calcined product; and
f) optionally removing the pore former from the calcined and optionally sintered product.

A method as described above makes it possible to incorporate a particularly defined and reproduced porosity into a lithium titanate framework or into a lithium titanate structure, in particular of an electrode for an electrochemical energy reservoir, in a simple and economical manner.

A lithium titanate framework can be in particular a framework or matrix which is based on the chemical formula $Li_4Ti_5O_{12}$ and whose properties, for example electrical and ionic conductivity, can optionally be improved in targeted fashion by the addition of doping elements, for example magnesium (Mg), aluminum (Al), iron (Fe), or others. The utilization or production of a framework of this kind allows the omission of any binders or conduction additives in the cathode structure, since the lithium titanate structure which is used is electrically and ionically conductive. The introduction of conduction additives, for example graphene or carbon nanotubes, is nevertheless also not precluded. The lithium titanate structure can be in direct contact with the active material, such as in particular a sulfur-containing compound.

Liquid substances such as electrolytes can also be completely omitted from the finished cell, so that the formation of soluble lithium polysulfide phases can, for example, be suppressed or prevented; this can allow a capacity that is particularly stable over the long term.

In a method step a), firstly a mixture of initial substances for formation of a lithium titanate can be furnished. A "mixture of initial substances" can be understood here in particular as a mixture having any number of different components, from which mixture lithium titanate can be manufactured using a suitable method. For example, lithium titanate, in particular a lithium titanate powder, can be manufactured from a mixture of, in particular, analytically pure lithium compounds and titanium compounds.

The resulting mixture of initial substances for formation of a lithium titanate can be calcined in a further method step b). "Calcination" for purposes of the present invention can in particular signify a treatment at elevated temperature. Temperatures of 800° C. or even higher can, for example, be used. The reaction mixture can be calcined, for example, in an oxidizing atmosphere (air) or in a reducing atmosphere (e.g. a mixture of hydrogen and argon) or in an inert atmosphere (e.g. argon). Thanks to the targeted influence on the oxygen vacancy concentration and valence conditions of the doping elements in the titanate, calcination in a reducing atmosphere can have a particularly advantageous effect on electrical and ionic conductivity.

Calcination can occur in particular in a hydrogen-containing atmosphere. For example, calcination can occur in a reducing atmosphere having a hydrogen concentration from $\geq 5$ vol % to $\leq 20$ vol % based on the total volume of the gases of the reducing atmosphere. Calcination can occur, for example, in a noble gas/hydrogen atmosphere, for example an argon/hydrogen atmosphere. A particularly advantageous electrical conductivity can thereby be achieved.

Calcination can furthermore occur at a temperature in a range from $\geq 700°$ C. to $\leq 900°$ C., for example at approximately 800° C. Alternatively or additionally, calcination can occur, for example, over a time period within a range from $\geq 6$ hours to $\leq 14$ hours, for example for approximately 10 hours. The mixture of initial substances can furthermore, in particular before calcination, be ground, for example using a ball mill, e.g. a planetary ball mill, and/or optionally extruded.

In order to introduce a defined reproducible porosity into the structure that is to be generated, in a further method step c) a component encompassing sulfur and optionally lithium can be added, before and/or after calcination, to the mixture of initial substances for formation of a lithium titanate. The skilled artisan understands here that the component encompassing sulfur and optionally lithium can be added to the mixture of initial substances for formation of a lithium titanate at any suitable point in time. For example, the component encompassing sulfur and optionally lithium can constitute, together with a lithium compound and a titanium compound, the initial mixture even before calcination. Alternatively, the component encompassing sulfur and optionally lithium can be added to the mixture after calcination.

The addition of a component encompassing sulfur and optionally lithium to the reaction mixture before sintering allows a component encompassing sulfur and optionally lithium to form, in a cathode structure that in particular can be ionically conductive and electrically conductive, cavities or pores that can be particularly defined and reproducible. The pore sizes, pore geometries, and number of pores and pore penetration in the structure that is generated can be adapted directly by varying the component encompassing sulfur and optionally lithium, in particular in terms of quantity, size, and shape. As a result it is particularly easy to adapt the structure being generated to the desired area of application. For example, the proportion of open pores or closed pores can be controlled by way of the proportion of the component encompassing sulfur and optionally lithium in the mixture, such that a high proportion can result in a high proportion of open pores.

The manufacture of a structure of this kind encompassing an active material can furthermore occur in one manufacturing step. Subsequent introduction of a sulfur- and optionally lithium-containing compound, serving in particular as an active material, can thus be omitted.

In this embodiment, sulfur or a sulfur-containing compound can thus be incorporated, in particular as an active material, into a stable and rigid structure that is usable directly as a cathode, for example in lithium-sulfur batteries. One advantage offered in particular in this embodiment is that the pores that are generated do not obligatorily need to be open in order for sulfur to be introduced into the structure at a later point in time. The pores, which can be formed in particular by the sulfur- and optionally lithium-containing material, can instead also form closed pores. Production can thereby be simplified because lesser requirements in terms of porosity are possible. The presence of closed pores around a phase encompassing sulfur and optionally encompassing lithium can furthermore be advantageous because diffusion of an, in particular, mobile lithium/sulfur phase out of the cathode into the region of an electrochemical energy reservoir during a charging or discharging cycle can thereby be prevented. A high capacity that is stable over the long term can thereby in particular be furnished. In addition, it is not necessary to supply a hyperstoichiometric sulfur proportion or active-material concentration, since the sulfur that is present can participate essentially completely in an electrochemical reaction. The process for manufacturing an electrode is moreover particularly economical because sulfur or a sulfur-containing component can be incorporated as an active material directly into the framework.

Alternatively or additionally, in order to obtain a defined and reproducible porosity in a lithium titanate structure, according to method step d) a pore former can be added, before and/or after calcination, to the mixture of initial substances for formation of a lithium titanate.

A "pore former" for purposes of the present invention can be in particular a substance that can be incorporated during the manufacturing process into the framework or into the matrix but can be removed at a later point in time, so that cavities or pores can remain behind.

One advantage of such an embodiment can be seen in the fact that the pores in the lithium titanate structure that is generates can be particularly defined and reproducible. In addition, a method in this embodiment can be particularly simple and economical, since the pores can be capable of being produced essentially in the course of the normal manufacturing process. In addition, the pore sizes, pore geometries, and number of pores or pore penetration in the structure that is generated can be adapted directly by varying the pore former, in particular in terms of number, size, and shape. This creates a particularly easy capability for adapting the structure that is to be generated to the desired application sector.

The pore former can encompass only one material or one substance, or can also encompass a mixture of substances. The use of two or more pore formers can result in a particularly homogeneous temperature profile and thus in lower temperatures during, for example, burnout. The pore formers make it possible in particular to generate hierarchical and interconnected pore structures so as thereby to enable particularly advantageous charging and/or discharging characteristics for an electrode or for an energy reservoir equipped with such an electrode.

In a further method step e), the calcined product can be sintered. Sintering can occur, for example, in an air atmosphere or in a noble gas atmosphere. Sintering can occur, for example, in an argon atmosphere (100% argon). Sintering can be accomplished, for example, at a temperature in a range from $\geq 850°$ C. to $\leq 950°$ C., for example at approximately 950° C. Sintering, which can serve for further growth and coalescence of the titanium crystals generated in the calcination step, can impart a particularly high level of strength and structure to the structure that is generated.

For the case in which a pore former has been added to the mixture of initial substances for formation of a lithium titanate, in a further step (e.g. before or after sintering) the pore former can be removed from the calcined and optionally sintered product. This can be achieved, for example, by burning out the pore former. Suitable conditions encompass, for example, temperatures in a range of less than or equal to 1550° C., for example corresponding to a sintering temperature for the lithium titanate; time spans from greater than or equal to 4 hours to less than or equal to 40 hours can be suitable. Pores or cavities that are suitable for receiving active material can thereby be formed at the locations that the pore former has occupied in the structure. This step can occur, for example, as a unit with sintering.

In addition, in order to enable particularly stable structures, the pore former can be removed before sintering and thus before formation of the ceramic phase, in order to prevent the pore former from remaining trapped inside the structure.

The pore former can be present, for example, at a concentration of less than or equal to 15 wt %. Examples of pore formers encompass, for example, thermoplastic polymers such as polybutylene, polymethylpentene, polyethylene, polypropylene, polystyrene, polyamides, acrylonitrile-butadiene-polystyrene (ABS), acrylic polyesters (PET), polyurethanes, polymethyl methacrylate (PMMA), or the like.

In a further method step, for the case in which no active material is added to the initial mixture, active material can correspondingly be introduced into the pores, for example, by melting pure sulfur above its melting point of approximately 112° C. Maximum pore filling with sulfur can be achieved by applying a negative pressure or by repeating the melting operation several times.

A further advantage of using a pore former can be seen in the fact that even active materials which might not be stable under the conditions existing in the context of calcination and/or sintering can be used. A particularly unrestricted selection of active material is thereby possible.

The method described above makes it possible to generate a lithium titanate structure, based in particular on the general formula $Li_4Ti_5O_{12}$, having either open and/or closed pores, where the porosity can be configured as a function of the process conditions and initial substances that are used. For example, the nature of the pores (i.e. whether in particular open or closed pores occur) can be dependent on the initial substances used, i.e. for example a ratio between the lithium titanate or the initial substances used therefor and the introduced sulfur- and optionally lithium-containing substance or pore former. A structure of this kind can be utilized, for example, as a cathode in a lithium-sulfur battery, with a desired separator (such as a polymer separator or a ceramic separator) and with a suitable anode (e.g. encompassing graphite, lithium).

In the context of an embodiment, the method can encompass the further method step of:

g) chemically and/or electrochemically inserting lithium into the calcined and optionally sintered product.

An insertion of (additional) lithium into a lithium titanate, that can also be referred to as a lithium titanium oxide, can advantageously allow the lithium ion conductivity of the lithium titanate to be raised. The electrical conductivity of the lithium titanate can also be appreciably raised by an insertion of lithium.

Lithium-inserted lithium titanate is therefore advantageously suitable as a mixed conductor for lithium cells, for example lithium-sulfur cells and/or lithium-ion cells.

The use, in a cathode of a lithium-sulfur cell, of a mixed conductor or a support structure or conductive structure made of lithium-inserted lithium makes it advantageously possible to furnish a stable cathode structure that is not subject to the negative effects that can occur, due to structural changes during operation, with conventional mixed carbon/sulfur cathodes.

The highest possible electrical conductivity is desirable for the use of lithium titanates as a support structure and/or conductive structure or as a lithium-ion-conducting layer in lithium cells, in particular in lithium cell cathodes, in particular when the lithium titanate is serving as an electrical conductor. This conductivity can be significantly increased by lithium insertion.

The lithium ion conductivity and electrical conductivity can be appreciably increased by an insertion of lithium into $Li_4Ti_5O_{12}$, in particular accompanied by the formation of $Li_{4+x}Ti_5O_{12}$ where $0<x\leq3$.

The insertion of lithium can be accomplished chemically by immersing the calcined and optionally sintered product into a lithium-containing liquid. For example, a butyllithium solution, for example of butyllithium in n-hexane, can be used for this. The calcined and optionally sintered product can remain in the lithium-containing liquid for a long period of time, for example several days or one or more weeks. During this residence time, lithium ions can penetrate from the lithium-containing liquid into the calcined and optionally sintered product and can intercalate or become inserted into its chemical structure. It is thereby possible to cause the lithium titanate, for example $Li_{4+x}Ti_5O_{12}$, to have a higher concentration of lithium than conventional lithium titanate ($Li_4Ti_5O_{12}$).

Alternatively, lithium insertion can be accomplished electrochemically. In particular, the calcined and optionally sintered product can be installed for this purpose as the cathode in a galvanic loading cell.

In the context of a further embodiment, the mixture of initial substances for formation of a lithium titanate can encompass at least one iron-containing initial material for formation of an iron-doped lithium titanate. For example, the initial mixture can encompass iron(III) oxide. Iron doping of the lithium titanate can advantageously raise the electrochemical potential of the lithium titanate to more than 2.0 V, in particular to approximately 2.3 V. Because the electrochemical potential of the iron-doped lithium titanate is set to be higher than the electrochemical potential of the baseline reaction of a lithium-sulfur battery (approx. 2.0 V), lithium (additionally) inserted into the lithium titanate can advantageously be stabilized by the iron doping, and self-discharge in the presence of sulfur can be avoided.

In this embodiment it is possible to prevent the occurrence, as often happens e.g. with known porous carbon/sulfur composites, of cyclic deposition and dissolution of $Li_2S$, which can result in a degradation or breakage of the cathode structure or in a loss of electrical contact between carbon particles. Preventing or at least appreciably limiting these effects, in accordance with the invention, allows an increase in the performance of the energy reservoir to be brought about, and allows cell capacity to be raised.

For example, a lithium titanate based on the general chemical formula $Li_4Ti_5O_{12}$ and corresponding to the general chemical formula $Li_{4+x-y}Fe_{3y}Ti_{5-2y}O_{12}$ can also be manufactured, where $0<y\leq1$, in particular $0.2\leq y\leq1$, and $0\leq x\leq3$.

In the context of a further embodiment, the component encompassing sulfur and optionally lithium can encompass lithium sulfide ($Li_2S$) and/or lithium sulfate ($Li_2SO_4$). This embodiment as well thus allows both a sulfur-containing compound and a lithium-containing compound to be incorporated together into an electrode structure. Lithium can thus already be incorporated into an electrode structure, thereby allowing further working steps to be eliminated. In particular when lithium sulfide is used, it can be advantageous that this compound has a melting point of 1372° C. It can thus remain solid even in the context of a sintering operation that can proceed usually in a temperature range of 1000° C. or less, which can simplify the stability of the structure and also the manufacturing method. The use of lithium sulfate can be advantageous in particular for cost reasons, since lithium sulfate can be reduced to lithium sulfide during the sintering operation in a reducing atmosphere. The same product as in the context of direct use of lithium sulfide can thus be economically manufactured.

In addition, if the sulfur-containing compound is added to the mixture before sintering or before calcination, a manufacturing method can occur with no need to provide particular steps, i.e. under standard conditions.

In the context of a further embodiment, the component encompassing sulfur and optionally lithium can be present in the form of particles having a size less than or equal to 20 nm. It is thereby possible to produce, in the lithium titanate framework or the electrode framework, pores that likewise have a diameter which is sufficiently small that the pore size can be defined substantially by the size of the particles encompassing sulfur and optionally lithium. Pores and particles that are of such small size can advantageously make it possible for all of the sulfur-containing material to be utilized in the context of a charging and/or discharging operation of an electrochemical energy reservoir. A capacity that is particularly stable over the long term can thereby be achieved. In addition, the quantity of sulfur, and optionally of lithium, that is used can be reduced, which can decrease costs.

In the context of a further embodiment, the mixture of initial substances for formation of a lithium titanate can encompass lithium carbonate ($Li_2CO_3$) and/or titanium dioxide ($TiO_2$). Lithium titanate can be generated in particularly simple fashion using such initial substances.

In the context of a further embodiment, the pore former can encompass starch and/or graphite. Such substances can be easily removed from the framework, so that particularly defined pores are possible thanks the use of the aforementioned substances; in addition, such substances do not react with the lithium titanate structure even at high temperatures, so that no negative effects on the structure occur during the manufacturing process.

In the context of a further embodiment, the pore former can be removed from the calcined and optionally sintered product by being burned out. This is a particularly simple method for removing the pore former from the structure. In this embodiment the pore former can moreover occur] in a reaction step (i.e. sintering) that proceeds in any case, so that in this embodiment the method can be carried out in particularly simple and economical fashion. Particularly complete removal of the pore former can moreover occur in this embodiment, so that the pores can be formable in particularly defined fashion. When starch and/or graphite are used as a pore former, for example, they can react to carbon monoxide or carbon dioxide as a result of heat treatment, and can thus be removed from the structure as gaseous substances. This can consequently be achieved in the same step as sintering, which can be advantageous in particular for cost reasons. In this embodiment the pore former can be added, for example, after calcination. In the context of sintering, a slow temperature rise or one adapted to gas evolution can then be advantageous in order to prevent the pore former from burning out too quickly. If the pore former combusts or burns out at 250° C., for example, a hold time can be implemented at that temperature and the temperature can only then be raised again to the sintering temperature, so that the resulting gas can be allowed to escape slowly.

With regard to further features and advantages of the method according to the present invention, reference is herewith explicitly made to the explanations in connection with the electrode according to the present invention, with the lithium-ion battery according to the present invention, with the FIGURE, and with the description of the FIGURE.

A further subject of the present invention is an electrode for use in a lithium-ion battery, in particular in a lithium-sulfur battery, encompassing a matrix made of a lithium titanate, in particular having the general formula $Li_{4+x-y}Fe_{3y}Ti_{5-2y}O_{12}$ where $0<y\leq1$, in particular $0.2\leq y\leq1$, and $0\leq x\leq3$, where the matrix can have at least partly closed pores in which at least one sulfur- and optionally lithium-containing component is disposed.

Because closed pores, in which a sulfur- and optionally lithium-containing compound is disposed, are disposed in the electrode structure or in the lithium titanate matrix, the active material can remain localized in the structure with particularly good long-term stability. A capacity that is particularly stable over the long term can thereby be achieved, good results being attainable even when small quantities of sulfur are used.

In the context of an embodiment, the matrix can exhibit pores having a size in a range of less than or equal to 20 nm. The result that can thereby be achieved is that the active material located in the pores can come substantially completely into contact with the conductive structure. Utilization of the sulfur is moreover particularly high and advantageous with a layer thickness of 10 nm sulfur on the titanate surface, since the reaction to $Li_2S$ can proceed almost completely. With greater layer thicknesses, the insulating properties of sulfur or of sulfur sulfide can cause the voltage drop across the layer of sulfur or sulfur sulfide to become too high, and active material that has no direct contact with the titanate or is separated by a 10-nm thick layer of $Li_2S$ can no longer participate in the reaction, so that overall capacity is reduced. The result is that in this embodiment, a good capacity can be achievable even with a small quantity of active material.

With regard to further features and advantages of the electrode according to the present invention, reference is herewith explicitly made to the explanations in connection with the method according to the present invention, with the lithium-ion battery according to the present invention, with the Figures, and with the description of the Figures.

A further subject of the present invention is a lithium-ion battery, in particular a lithium-sulfur battery, encompassing an electrode embodied as described above.

With a lithium-ion battery of this kind, a capacity that is particularly stable over the long term can be achieved, so that good capacities are attainable even with the use of small quantities of sulfur, or of a small quantity of active material.

With regard to further features and advantages of the lithium-ion battery electrode according to the present invention, reference is herewith explicitly made to the explanations in connection with the method according to the present invention, with the electrode according to the present invention, with the Figures, and with the description of the Figures.

BRIEF DESCRIPTION OF THE DRAWING

The FIGURE schematically depicts an embodiment of an energy reservoir according to the present invention.

DETAILED DESCRIPTION

The FIGURE schematically depicts an embodiment of a lithium-ion battery 10 in accordance with the invention. An energy reservoir of this kind can be utilized in particular in vehicles, for example a hybrid, plug-in hybrid, or electric vehicle, in an energy storage facility, for example for stationary energy storage, e.g. in a home or in a technical facility, in electric power tools, in electric garden tools, or in electronic devices, for example notebook computers, PDAs, or mobile telephones.

A lithium battery 10 of this kind encompasses an electrode 12, manufactured with a method according to the present invention, that has pores 14 in a matrix of lithium titanate. Pores 14 can be open and/or closed. Lithium-ion battery 10 furthermore encompasses an anode 16, for example a lithium anode or an anode 16 made of a material that can reversibly intercalate lithium ions, and also an electrolyte 18 disposed between the anode and cathode. Electrolyte 18 can be, for example, a solid electrolyte, for example doped garnet based on the formula $Li_7La_3Zr_2O_{12}$, or a solid glass/ceramic electrolyte such as $Li_2S$—$P_2S_2$—$P_2O_5$.

As shown in the FIGURE, an electrode structure of this kind can be generated, for example, from a lithium titanate powder. The latter can be formed, for example, from a mixture of analytically pure lithium carbonate ($Li_2CO_3$, 99%, obtainable e.g. from the Alfa Aesar company) and titanium dioxide ($TiO_2$, rutile structure, obtainable from the Tronox company). The initial substances can be combined into an initial mixture in order to obtain a suitable stoichiometric composition. A 3-wt % excess of lithium carbonate can be used, for example, in order to counteract lithium loss in subsequent reaction steps, for example a heat treatment or treatment in a planetary ball mill. The reaction mixture can then be calcined in an oxidizing atmosphere (air) or in a reducing atmosphere (e.g. a mixture of hydrogen and argon) or in an inert atmosphere (e.g. argon), for example at 800° C. for a period of 10 hours. The calcined powder can moreover be shaped, for example by extrusion, into pellets and can be sintered in an oxidizing atmosphere (air) or in a reducing atmosphere (e.g. a mixture of hydrogen and argon) or in an inert atmosphere (e.g. argon), for example at 950° C. for a period of 10 hours. Samples manufactured in this manner result in substantially pure spinel ($Li_4Ti_5O_{12}$).

In addition, further lithium can be inserted into a lithium titanate of this kind ($Li_4Ti_5O_{12}$). For chemical insertion of lithium, and thus for the manufacture of $Li_{4+x}Ti_5O_{12}$ where $0<x\leq3$, sintered $Li_4Ti_5O_{12}$ pellets are immersed into a solution that contained a suitable quantity of butyllithium. The butyllithium-containing solution was produced by mixing a 15-wt % solution in n-hexane (Merck company) with 10 ml n-hexane (Merck company). The pellets were stirred in the butyllithium-containing solution for seven days.

An example of an electrochemical insertion of lithium into $Li_{4-y}Fe_{3y}Ti_{5-2y}O_{12}$, and thus the manufacture of $Li_{4+x-y}Fe_{3y}Ti_{5-2y}O_{12}$, can proceed as follows: For the electrochemical insertion of lithium into $Li_{4-y}Fe_{3y}Ti_{5-2y}O_{12}$, and thus in order to produce $Li_{4-y+x}Fe_{3y}Ti_{5-2y}O_{12}$ where $0<x\leq3$, a test cell was assembled containing a lithium metal anode, a composition encompassing $Li_{4-y}Fe_{3y}Ti_{5-2y}O_{12}$ as cathode, 350 μl of a 1.0 M solution of $LiPF_6$ in ethylene carbonate (EC)/dimethyl carbonate (DMC) (1:1 mixture by volume) as a liquid electrolyte, and a glass microfiber separator marketed under the commercial name Whatman. The cathode composition encompassed 84 wt % $Li_{4-y+x}Fe_{3y}Ti_{5-2y}O_{12}$ powder, 8 wt % carbon black, and 8 wt % polyvinylidene fluoride (PVdF), and was applied by film casting onto a current collector made of aluminum.

It can furthermore be possible, by way of example, to manufacture an iron-doped lithium titanate, e.g. $Li_{4-y}Fe_{3y}Ti_{5-2y}O_{12}$. $Li_{4-y}Fe_{3y}Ti_{5-2y}O_{12}$, where y=0.345 to 0.75, can be manufactured e.g. using a conventional solid ceramic reaction. The initial compounds used in this context were lithium carbonate ($Li_2CO_3$, 99% pure, from Alfa Aesar), titanium dioxide ($TiO_2$, rutile, from Tronox), and iron oxide ($Fe_2O_3$, from Merck). The initial compounds were weighed, a 3% excess of $Li_2CO_3$ being used in order to compensate for lithium loss during calcination. The initial compounds were then ground using a planetary ball mill. The resulting powder mixture was calcined for 10 hours at 800° C. in an air atmosphere. Samples produced in this manner contained the desired single-phase product.

It can also be possible by way of example, when manufacturing iron-doped lithium titanate such as $Li_{4-y}Fe_{3y}Ti_{5-2y}O_{12}$ or undoped titanate, also to introduce a sulfur- and lithium-containing component, for example $Li_2S$ or $Li_2SO_4$, after calcination. For example, $Li_{4-y}Fe_{3y}Ti_{5-2y}O_{12}$, where y=0.345 to 0.75, can be manufactured by a conventional solid ceramic reaction. The initial compounds used in this context were lithium carbonate ($Li_2CO_3$, 99% pure, from Alfa Aesar), titanium dioxide ($TiO_2$, rutile, from Tronox), and iron oxide ($Fe_2O_3$, from Merck). The initial compounds were weighed, a 3% excess of $Li_2CO_3$ being used in order to compensate for lithium loss during calcination. The initial compounds were then ground using a planetary ball mill. The resulting powder mixture was calcined for 10 hours at 800° C. in an air atmosphere. Between 20 and 80 wt % $Li_2S$ (Alfa Aesar) was then added to the calcined titanate. The initial compounds were then ground again using a planetary ball mill and were sintered in a reducing atmosphere (e.g. a mixture of hydrogen and argon) or in an inert atmosphere (e.g. argon), for example at 950° C. for a period of 10 hours. Samples manufactured in this manner result substantially from the desired mixture of (optionally iron-doped) titanate ($Li_4Ti_5O_{12}$) and lithium sulfide ($Li_2S$).

What is claimed is:

1. A method for manufacturing an electrode for an electrochemical energy reservoir, comprising:
    furnishing a mixture of initial substances for formation of a lithium titanate, wherein the mixture of initial substances for formation of the lithium titanate includes at least one of lithium carbonate and titanium dioxide;
    calcining the mixture of initial substances for formation of the lithium titanate;
    adding to the mixture of initial substances for formation of the lithium titanate at least one of:
        at least one of before and after calcination, a component encompassing sulfur, wherein the component is present in the form of particles having a size less than or equal to 20 nm and includes at least one of lithium sulfide and lithium sulfate, and
        at least one of before and after calcination, a pore former; and
    sintering the calcined product.

2. The method as recited in claim 1, wherein the electrochemical energy reservoir includes a lithium-ion battery.

3. The method as recited in claim 1, wherein the component includes lithium.

4. The method as recited in claim 1, further comprising removing the pore former from the calcined and sintered product.

5. The method as recited in claim 1, further comprising:
    at least one of chemically and electrochemically inserting lithium into the calcined and sintered product.

6. The method as recited in claim 1, wherein the mixture of initial substances for formation of the lithium titanate includes at least one iron-containing initial material for formation of an iron-doped lithium titanate.

7. The method as recited in claim 5, wherein a lithium titanate corresponding to the general chemical formula $Li_{4+x-y}Fe_{3y}Ti_{5-2y}O_{12}$ is manufactured, where $0<y\leq1$ and $0\leq x\leq3$.

8. The method as recited in claim 7, where $0.2\leq y\leq1$.

9. The method as recited in claim 1, wherein the pore former includes at least one of starch and graphite.

10. The method as recited in claim 1, further comprising removing the pore former from the calcined and sintered product by being burned out.

11. The method as recited in claim 2, wherein the manufactured electrode includes a matrix made of the lithium titanate, the matrix including at least partly closed pores in which at least one sulfur component is disposed.

12. The method as recited in claim 11, wherein the lithium-ion battery includes a lithium-sulfur battery.

13. The method as recited in claim 11, wherein the lithium titanate has the general formula $Li_{4+x-y}Fe_{3y}Ti_{5-2y}O_{12}$, where $0\leq y\leq1$ and $0\leq x\leq3$.

14. The method as recited in claim 11, wherein the lithium titanate has the general formula $Li_{4+x-y}Fe_{3y}Ti_{5-2y}O_{12}$, where $0.2\leq y\leq1$ and $0\leq x\leq3$.

15. The method as recited in claim 11, wherein the component includes lithium.

16. The method as recited in claim 11, wherein the matrix includes pores having a size in a range of less than or equal to 20 nm.

17. A method for manufacturing an electrode for an electrochemical energy reservoir, comprising:
    furnishing a mixture of initial substances for formation of a lithium titanate;

calcining the mixture of initial substances for formation of the lithium titanate;
adding to the mixture of initial substances for formation of the lithium titanate at least one of:
  at least one of before and after calcination, a component comprising sulfur, lithium sulfide, or lithium sulfate, wherein the component is present in the form of particles having a size less than or equal to 20 nm, and
  at least one of before and after calcination, a pore former; and
sintering the calcined product.

18. A method for manufacturing an electrode for an electrochemical energy reservoir, comprising:
furnishing a mixture of initial substances for formation of a lithium titanate;
calcining the mixture of initial substances for formation of the lithium titanate;
adding to the mixture of initial substances for formation of the lithium titanate at least one of:
  at least one of before and after calcination, a component comprising lithium sulfide, wherein the component is present in the form of particles having a size less than or equal to 20 nm, and
  at least one of before and after calcination, a pore former; and
sintering the calcined product.

19. A method for manufacturing an electrode for an electrochemical energy reservoir, comprising:
furnishing a mixture of initial substances for formation of a lithium titanate;
calcining the mixture of initial substances for formation of the lithium titanate;
adding to the mixture of initial substances for formation of the lithium titanate at least one of:
  at least one of before and after calcination, a component comprising sulfur, lithium sulfide, or lithium sulfate, and
  at least one of before and after calcination, a pore former;
sintering the calcined product; and
at least one of chemically and electrochemically inserting lithium into the calcined and sintered product, wherein chemically inserting lithium into the calcined and sintered product comprises adding butyllithium to the calcined and sintered product.

20. A method for manufacturing an electrode for an electrochemical energy reservoir, comprising:
furnishing a mixture of initial substances for formation of a lithium titanate;
calcining the mixture of initial substances for formation of the lithium titanate;
adding to the mixture of initial substances for formation of the lithium titanate, at least one of before and after calcination, a pore former comprising a thermoplastic polymer; and
sintering the calcined product.

\* \* \* \* \*